United States Patent
Kishi et al.

(10) Patent No.: US 7,444,975 B2
(45) Date of Patent: Nov. 4, 2008

(54) CONTROL OF ENGINE INTAKE SYSTEM

(75) Inventors: Shinji Kishi, Hiroshima (JP); Shinichi Sugihara, Higashihiroshima (JP); Masashi Marubara, Hiroshima (JP); Toshihide Yamamoto, Higashihiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 11/674,170

(22) Filed: Feb. 13, 2007

(65) Prior Publication Data
US 2007/0186892 A1 Aug. 16, 2007

(30) Foreign Application Priority Data
Feb. 14, 2006 (JP) ............... 2006-037057

(51) Int. Cl.
F02M 35/10 (2006.01)
F01L 1/34 (2006.01)

(52) U.S. Cl. ............... 123/184.55; 123/90.15; 123/346

(58) Field of Classification Search ........... 123/184.55, 123/184.56, 184.57, 90.15, 345–348
See application file for complete search history.

(56) References Cited

U.S. PATENT DOCUMENTS

| | | | | |
|---|---|---|---|---|
| 4,671,217 A | * | 6/1987 | Hitomi et al. | 123/184.44 |
| 4,679,531 A | * | 7/1987 | Hitomi et al. | 123/184.42 |
| 4,690,106 A | * | 9/1987 | Nakayama et al. | 123/184.42 |
| 4,735,177 A | * | 4/1988 | Koike | 123/184.42 |
| 4,738,233 A | * | 4/1988 | Hitomi et al. | 123/190.2 |
| 4,793,294 A | | 12/1988 | Wada | |
| 4,802,452 A | * | 2/1989 | Kanesaka | 123/376 |
| 4,932,378 A | * | 6/1990 | Hitomi et al. | 123/432 |
| 5,408,962 A | | 4/1995 | Tallio et al. | |
| 5,441,023 A | * | 8/1995 | Ma | 123/184.57 |
| 5,937,821 A | * | 8/1999 | Oda et al. | 123/295 |

(Continued)

FOREIGN PATENT DOCUMENTS

EP 0288039 10/1988

(Continued)

OTHER PUBLICATIONS

European Patent Office, European Search Report of EP07003062, Jun. 20, 2007, EPO, pp. 27-28.

*Primary Examiner*—Hai H Huynh
(74) *Attorney, Agent, or Firm*—Alleman Hall McCoy Russell & Tuttle LLP

(57) ABSTRACT

A method of controlling an intake air passage of an internal combustion engine is provided. The intake air passage cyclically communicates to a combustion chamber of the internal combustion engine, thereby inducting fresh air into said combustion chamber. The cyclic communication of the intake air passage to the combustion chamber generates a pressure wave in the intake air passage. The method comprises reducing an effective length of a transmission path of the pressure wave in an upstream direction of the intake air passage as a desired air flow to the combustion chamber decreases. In accordance with the method, the effective length of the pressure wave transmission path is reduced as desired air flow decreases. With the reduced effective length, the pressure wave bounces back and forth between ends of the transmission path more often before the next cyclic communication. The more bouncing attenuates the pressure wave at the next cyclic communication. Therefore, the cylinder air charge can be stabilized when the desired air flow is decreased.

13 Claims, 13 Drawing Sheets

U.S. PATENT DOCUMENTS

| | | |
|---|---|---|
| 6,360,719 B1 * | 3/2002 | Uitenbroek ................ 123/399 |
| 6,595,186 B2 | 7/2003 | Hiyoshi et al. |
| 2004/0255892 A1 | 12/2004 | Marentette |
| 2006/0037570 A1 * | 2/2006 | Hitomi et al. ............ 123/90.15 |

FOREIGN PATENT DOCUMENTS

| | | |
|---|---|---|
| EP | 0947678 | 10/1999 |
| EP | 1094209 | 4/2001 |
| JP | 2004-137982 A | 5/2004 |
| JP | 2004-197656 A | 7/2004 |
| JP | 2004-301058 A | 10/2004 |
| JP | 2006-097647 A | 4/2006 |

* cited by examiner (A) <u>Shutter Valve Open</u>

(B) <u>Shutter Valve Closed</u>

Smaller Valve Lift (1) Valve Closed (2) Valve Open (A) Intake Air Pressure with Retarded Intake Valve Opening After TDC (B) Intake Air Pressure with Intake Valve Opening Before TDC

CONTROL OF ENGINE INTAKE SYSTEM

BACKGROUND

The present description relates to an intake system of an internal combustion engine, and more particularly to control of a variable intake system and a variable valve lift system.

There is known and presented, for example in Japanese Patent Application Publication JP2004-137982A, a variable intake system of an internal combustion engine, which is capable of adjusting an effective length of an intake air passage to be more suitable for a current engine speed. It utilizes a pulse wave that a motion of air in the intake passage just upstream of an intake valve generates. Conventionally, an intake valve begins to open at a beginning of an intake stroke of a cylinder cycle. When a piston in an engine cylinder passes its top dead center and then descends, the intake valve is substantially or effectively open, and air is sucked into the cylinder. Then, the piston descends, and a negative pressure is generated in an intake port throat which is just upstream of the intake valve.

The negative pressure generates a pressure wave. It transmits upstream in the intake passage. Then, the pressure wave reflects at a larger air volume, for example a surge tank, which may be called an upstream end of a transmission path of the pressure wave. Then, it goes back to the intake valve, which may be called a downstream end of the pressure wave transmission path. The intake valve cyclically opens and closes synchronously with a rotation of a crankshaft of the engine. If the pressure wave reaches at the intake valve which is closed, it reflects there and goes upstream again. If a positive pressure portion of pressure wave reaches at the intake valve that is open, more air can be charged into the cylinder, which is called a supercharging effect.

The variable intake system can synchronize the pressure wave reaching at the intake valve with the openings of the intake valve by adjusting the effective length of the pressure wave transmission path in accordance with a frequency of the intake valve opening that corresponds to the engine speed. It can make a positive pressure portion of the pressure wave to reach at the intake valve at timing when it is open. Therefore, the variable intake system can increase the air charge through a range of the engine speed by changing the effective length.

On the other hand, when a desired intake airflow is smaller, in particular, at a lower engine speed, such as during an engine idling, the air charge to the individual cylinder is usually relatively small. The effective lengths of the pressure wave transmission path for the respective cylinders may vary, for example due to constraints of the intake system design. The variation of the effective lengths may cause the air charge to fluctuate between the respective cylinders, because some of the cylinders may have the supercharging effect and some may not. When the desired airflow is smaller, the air charge fluctuation may be relatively greater. It may cause variation of air-fuel ratio in the combustion chamber, for example. In turn, it may cause unstable combustion and output torque fluctuation, and increase noise or vibration of the engine.

Further, if the airflows to the respectively cylinders are independently controlled, for example by adjusting intake valve lifts, the individual cylinder charges may fluctuate from each other due to mechanical variations of the components, for example. When the desired airflow is smaller, the fluctuation is great relatively to the airflow. When it combines with the cylinder charge fluctuation caused by the variable intake system, the total cylinder charge fluctuation may increase significantly. Therefore, there is a need to improve the variable intake system in terms of the operation for the smaller airflow.

SUMMARY

Accordingly, there is provided, in one aspect of the present description, a method of controlling an intake air passage of an internal combustion engine. The intake air passage cyclically communicates to a combustion chamber of the internal combustion engine, thereby inducting fresh air into said combustion chamber. The cyclic communication of the intake air passage to the combustion chamber generates a pressure wave in the intake air passage. The method comprises reducing an effective length of a transmission path of the pressure wave in an upstream direction of the intake air passage as a desired airflow to the combustion chamber decreases.

In accordance with the method, the effective length of the pressure wave transmission path is reduced as desired air flow decreases. With the reduced effective length, the pressure wave bounces back and forth between ends of the transmission path more often until the next cyclic communication begins. The more bouncing attenuates the pressure wave more by the time of the next cyclic communication. Therefore, the cylinder air charge can be stabilized when the desired air flow is decreased.

In another aspect of the present invention, there is provided a method of controlling the intake air passage described above. The method comprises reducing an effective length of the transmission path of the pressure wave in the upstream direction of the intake air passage and retarding beginning of the cyclic communication as desired air flow to the combustion chamber decreases.

In accordance with the method, the effective length of the pressure wave transmission path is reduced as desired air flow decreases. Therefore, the pressure wave may be attenuated as described above. At the same time, the beginning of the cyclic communication of the intake air passage to the combustion chamber, for example the intake valve opening, is retarded when the desired air flow is smaller. At that time, the intake valve lift may be reduced, as described above. It may cause the fluctuation of the cylinder air charges. With the retarded beginning of the cyclic communication, the airflow into the combustion chamber has a faster rate when the communication is substantially established, for example, when the intake valve is substantially open. This may suppress the fluctuation of the air charge between the cylinders. However, at the same time, a greater negative pressure is generated just upstream of the intake valve in the intake air passage at the beginning of the communication, for example because the piston may position lower, and the cylinder pressure may be more negative, when the intake valve is substantially open. The greater negative pressure may generate a greater pressure wave in the intake air passage. But, as described above, the reduced effective length may attenuate the pressure wave. Therefore, the cylinder air charge can be stabilized when the desired airflow is smaller.

BRIEF DESCRIPTION OF THE DRAWINGS

The advantages described herein will be more fully understood by reading an example of embodiments in which the above aspects are used to advantage, referred to herein as the Detailed Description, with reference to the drawings wherein.

DETAILED DESCRIPTION

An embodiment of the present description will now be described with reference to the drawings, starting with FIG. 1, which shows a schematic view of an engine system mounted on a vehicle, such as an automotive vehicle. The output of the engine system is transmitted to vehicle driving wheels through a power transmission mechanism as is well known in the art. The engine system comprises an internal combustion engine 1, an engine controller 100 that controls the engine 1 and other subsystems described below.

Figure 1:
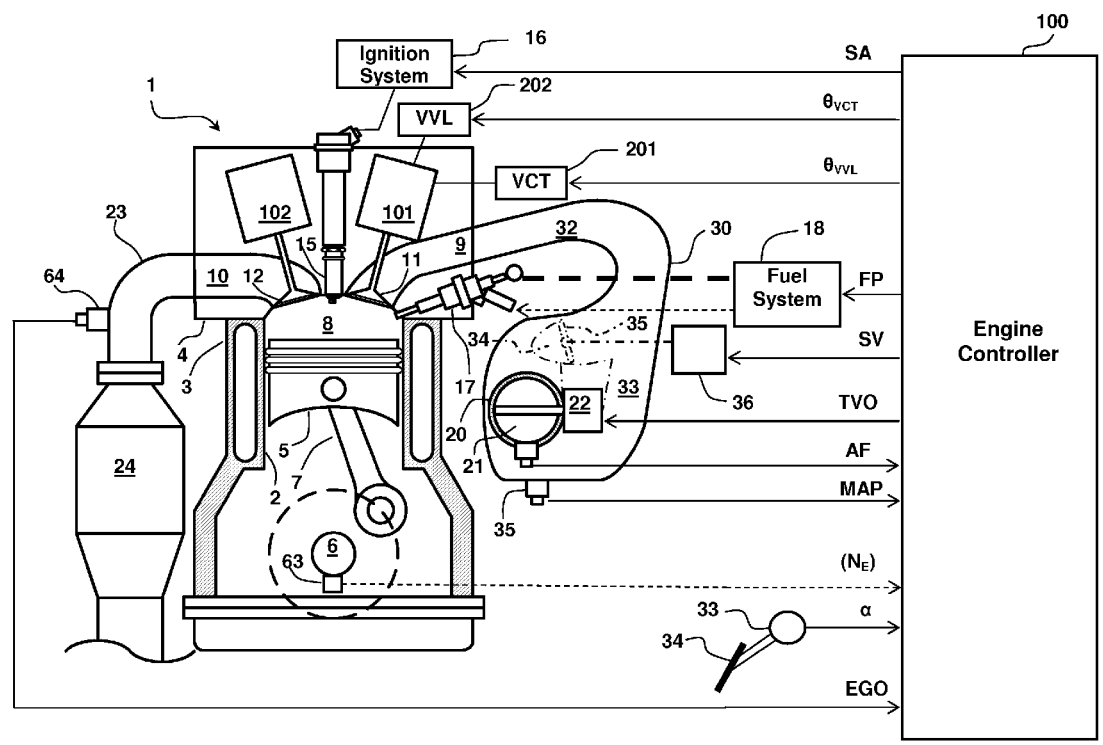
FIG. 1 is a schematic view showing an engine system according to an embodiment of the present description.

The internal combustion engine 1 has four cylinders 2, in the present embodiment, although only one cylinder is shown in FIG. 1 and the engine 1 may have any number of cylinders. The engine 1 comprises a cylinder block 3, and a cylinder head 4, which is arranged on the cylinder block 3. The cylinder 2 accommodates a piston 5 which slides therein. As is well known in the art, the cylinder block 3 rotationally supports a crankshaft 6 using journals, bearings and the like. Further, a connecting rod 7 links the crankshaft 6 and the piston 5. The cylinder head 4, the cylinder 2, and the piston 5 collectively define a combustion chamber 8 inside.

Although only one is illustrated in FIG. 1, two intake ports 9 are formed in the cylinder head 4, and respectively open to the combustion chamber 8. Likewise, two exhaust ports 10 are formed in the cylinder head 4, and respectively open to the combustion chamber 8. Intake valves 11 and exhaust valves 12 are respectively capable of shutting the intake ports 9 and the exhaust ports 10 from the combustion chamber 8 as shown in FIG. 1. Valve drive mechanism 101 and 102 respectively drives the intake and exhaust valves 11 and 12 as described in greater detail below.

A spark plug 15 for the each cylinder 2 is mounted to the cylinder head 4 in the well known manner such as threading. An ignition circuit or system 16 receives a control signal SA from an engine controller 100, and provides electric current to the spark plug 15 so that it makes a spark at the plug gap in the combustion chamber 8 at desired ignition timing.

For the each cylinder 2, a fuel injector 17 is mounted to the cylinder head 4 at one side of a cylinder center axis in a known manner such as using a mounting bracket. A tip end of the injector 17 faces the inside of the combustion chamber 8 from a space vertically below and horizontally between the two intake ports 9. A fuel supply system 18 includes a high pressure pump and an injector driver circuit not shown, and supplies fuel, in this case gasoline, from a fuel tank not shown. Also, the fuel supply system 18, particularly an injector driver circuit therein, activates a solenoid of the injector 17 to open the spray nozzles in accordance with a control signal FP from the engine controller 100, in order to inject desired amount of fuel at desired timing. The fuel is not limited to the gasoline, but may be any fuel including ethanol and hydrogen as far as it can be ignited by the spark from the spark plug 15. The injector 17 is not limited to being arranged to directly inject fuel into the combustion chamber 8 (direct fuel injection), but it may be arranged to inject fuel into the intake port 9 (port fuel injection).

An intake manifold 30 is attached to the cylinder head 4 in well known manner such as by threading with bolts. Each of the intake ports 9 connect in fluid communication to a surge tank 31 (only shown in FIG. 2) through upstream and downstream branch intake passages 32 and 33 all of which are integrally formed with the intake manifold 30. The branch intake passages 32 and 33 are provided for the respective cylinders 2 or combustion chamber 8.

Therefore in this embodiment having four cylinders, there are four sets of the branch intake passages 32 and 33. They are connected in fluid communication to each other by a communication chamber 34 at respective connecting portions between the upstream and downstream branch intake passages 32 and 33.

Shutter valves 35 are arranged between the connecting portions of the branch intake passages 32 and the communication chamber 34, which are pivoted around a common axis and capable of opening and closing the fluid communication between the branch intake passages 32 and 33 and the communication chamber. A shutter actuator 36 is provided to operate the shutter valves 35 to open and close the fluid communication in accordance with a signal SV from the engine controller 100.

Upstream of the surge tank 31, a throttle body 20 is coupled to the intake manifold 30. It accommodates a throttle valve 21 therein. It pivots and regulates engine intake airflow to the surge tank 31 from an air cleaner not shown, as is well known in the art. A throttle actuator 22, for example, an electric motor or a vacuum actuator, adjusts an opening of the throttle valve 21 in accordance with a control signal TVO from the engine controller 100.

The exhaust ports 10 are connected to an exhaust manifold 23. Exhaust gas from the combustion chamber 8 flows through the exhaust manifold 23 to a catalytic converter 24, and then to an exhaust pipe not shown, as is well known in the art.

Figure 2:
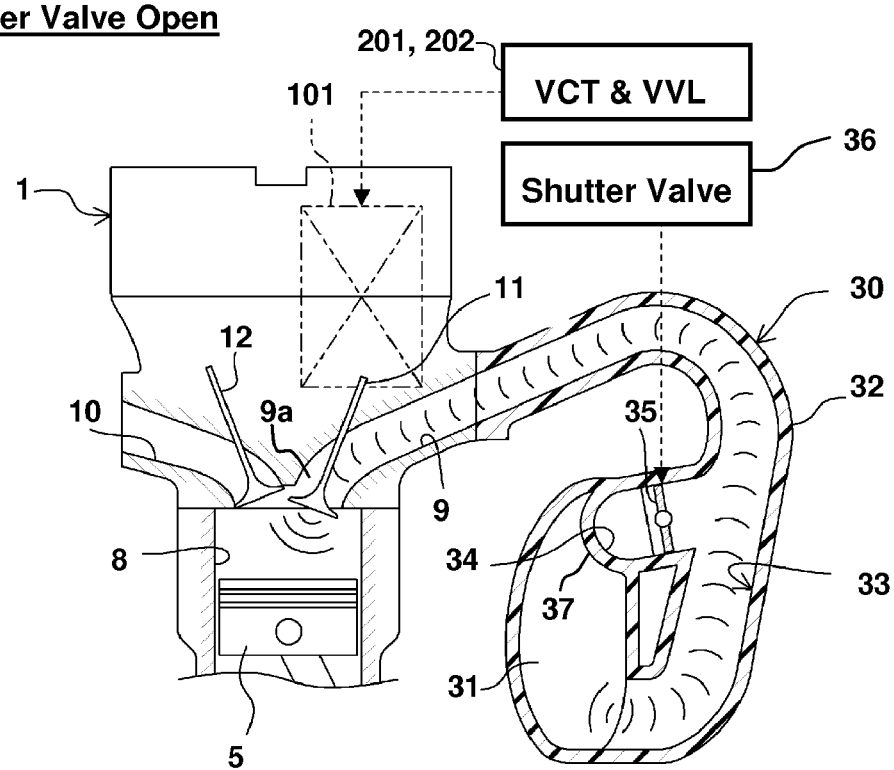
FIG. 2 shows an operation of a shutter valve of a variable intake system with an open state (A) and an closed state (B) of the shutter valve in accordance with the embodiment.
Figure 2:
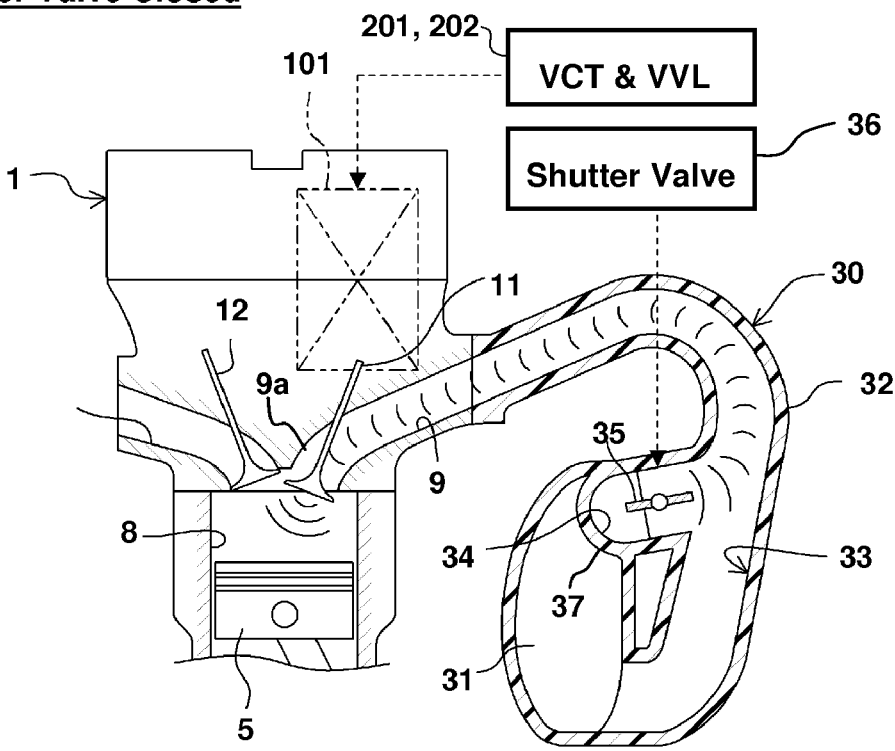

Referring to FIG. 2, the supercharging effect by an intake air passage consisting of the intake port 9 and the branch intake passages 32 and 33 will now be described. There are shown two different states of the intake air passage, namely a closed state (A) and an open state (B) of the shutter valves 35.

In FIG. 2(A), the shutter valves 35 shut off the communication chamber 34 from the branch intake passages 32 and 33. When the intake valve 11 opens the communication of the intake air passage to the combustion chamber 8 at the beginning of an intake stroke of a cylinder cycle, the descending movement of the piston 5 causes a negative pressure in a throat 9a of the intake port 9 just upstream of the intake valve 11. The negative pressure wave transmits through the intake air passage, i.e. the intake port 9 and the branch intake passages 32 and 33, to the surge tank 31. Since volume of the surge tank 31 is much greater than volume of the branch intake passages 32 and 33, the pressure wave is reflected at the upstream end of the upstream branch intake passages 33 at the surge tank, and at the same time, it turns its phase in reverse, in other words, to be the positive pressure wave. Then, it goes back through the branch intake passages 32 and 33 to the throat 9a of the intake port 9.

If the positive pressure wave reaches the intake port throat 9a when the intake valve 11 is open, or in other words, a synchronization between the pressure wave and the intake valve timing occurs, it boosts cylinder air charge, which is so-called inertia supercharging effect. The synchronization occurs if the sound speed times cycle time of the intake valve operation equals to an effective length for which the pressure wave transmits back and forth from the intake valve 11. The effective length can be calculated from an actual length of and respective sectional areas on a path of the transmission of the pressure wave. In this embodiment, the intake port 9 and the branch intake passages 32 and 33 are configured so that the synchronization occurs at a certain engine speed, for example, between 3000 and 4000 rpm.

If the positive pressure wave reaches the intake port throat 9a while the intake valve 11 is closed, the positive pressure wave reflects and turns its phase to be a negative pressure wave at the intake port throat 9a. The negative pressure wave bounces back from the surge tank 31 to keep the pressure oscillation. As a result, this pressure oscillation remains in the branch intake passage 5 or, in other words, makes pulsation while it attenuates over time. The remaining positive pressure may still boost the intake air charge if it reaches at the intake port throat 9a when the intake valve 11 opens. This may occur at engine speeds less than the certain synchronizing engine speed and may be called a pulsation effect.

On the other hand, when the shutter valve 35 opens the branch intake passages 32 to the communication chamber 34 as shown in FIG. 2(B), the negative pressure wave from the intake port throat 9a reaches the communication chamber 34 prior to reaching the surge tank 31 because the communication chamber 34 is closer to the intake port throat 9a. Since volume of the communication chamber 34 is much greater than that of the branch intake passage, the negative pressure reflects at the communication chamber 34 rather than at the surge tank 31.

Therefore, time for the pressure wave transmitting between the intake port throat 9a and the reflecting point is shorter in the case of the shutter valve 35 open than closed. In other words, the pressure wave transmits for a shorter distance or the reduced effective length of the pressure wave transmission. Consequently, the inertial supercharging effect occurs at higher engine speeds than the synchronizing engine speed for the closed shutter valve 35.

Although a wall 37 divides the surge tank 31 and the communication chamber 34 in the above embodiment, alternatively, the wall 37 may be removed and the communication chamber 34 may be part of the surge tank 31.

Figure 3:
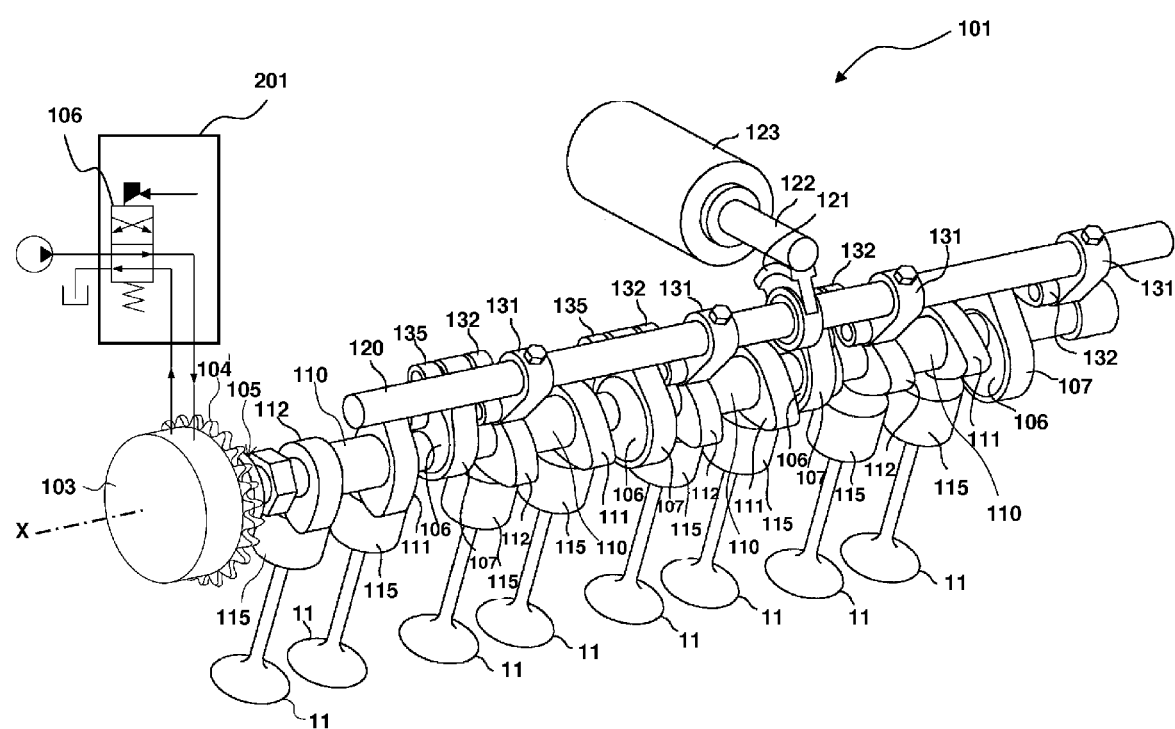
FIG. 3 shows a perspective view of an intake valve drive mechanism including a variable cam timing mechanism and a variable valve lift mechanism in accordance with the embodiment.

Referring to FIG. 3, the valve drive mechanism 101 for the intake valves 11 will now be described in more detail. Referring to FIG. 3, there is shown the valve drive mechanism 101 for the intake valves 41. The valve drive mechanism 102 for the exhaust valves 12 has a same construction as for the intake in the present embodiment. Therefore the specific description for the mechanism 102 will be omitted. Alternatively, the valve drive mechanism 102 for the exhaust valves may be of a conventional overhead camshaft (OHC) type. The OHC type valve drive mechanism comprises a cam for pushing a valve stem, a camshaft integrally forming the cam, and a camshaft drive-train such as chain and sprocket for transmitting rotational movement of the crankshaft 6 to the camshaft, as is well known in the art.

The valve drive mechanism 101 has a variable cam timing (VCT) mechanism 103, which is linked to the crankshaft 21 through a chain drive mechanism including a driven sprocket 104, a drive sprocket at the crankshaft 21, and a chain not shown and engagingly wounded around the drive and driven sprockets. The VCT mechanism 103 comprises a casing, which is affixed to the sprocket 103 to rotate with it, and a rotor, which is affixed to an inner shaft 105 and rotates with it. Between the casing and the rotor of the VCT mechanism 103, there are formed a plurality of hydraulic chambers, which are circumferentially arranged around the rotational axis X. Fluid pressurized by a pump, such as engine oil, is selectively supplied to each of the hydraulic chambers to make a pressure difference between the opposing chambers. A VCT control system 201 including an electromagnetic valve 106 adjusts the hydraulic fluid supplied to the chambers. The electromagnetic valve 106 cyclically switches hydraulic acting directions to the chambers in a duty ratio in accordance with a control signal $\theta_{VCT}$ from the engine controller 100 and an actual phase difference between the sprocket 104 and the inner shaft 105, thereby achieving a desired rotational phase of the inner shaft 105, as is known in the art.

The inner shaft 105 has an eccentric disc-shaped cam 106 for each of the cylinders 22. The eccentric cam 106 is formed integrally but not coaxially with the inner shaft 105 and rotates at a phase defined by the VCT mechanism 103. Freely rotationally fitted around the eccentric disc 106 is an inner surface of a ring arm 107. Therefore, the ring arm 107 can self rotate around a center axis Y of the eccentric cam 106 (only shown in FIG. 6) and orbit around the rotational axis X, as the inner shaft 105 rotates around the rotational axis X.

Figure 4:
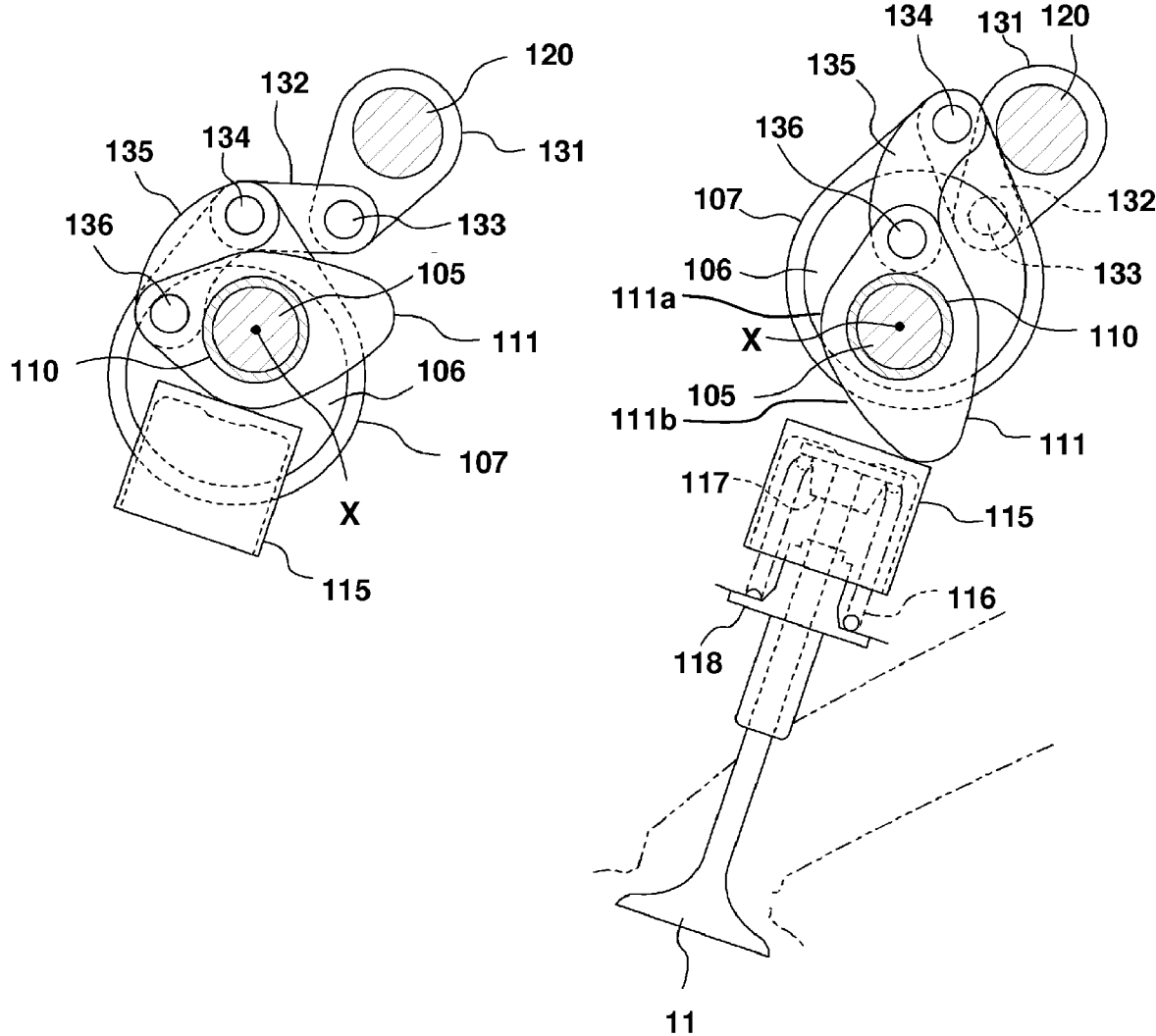
FIG. 4 shows a side view of the variable valve lift mechanism for a valve open state (1) and a valve closed state (B) with a greater valve lift in accordance with the embodiment.

Arranged around the inner shaft 105 is a rocker connector 110 for each of the cylinders 22. The rocker connector 110 pivots coaxially with the inner shaft 105, in other words, around the axis X, and integrally forms first and second rocker cams 111 and 112. The rocker connector 110 forms a bearing journal at its outer circumferential surface, so that a bearing cap not shown arranged on the cylinder head 24 can rotationally support the rocker cam parts 110 through 112. As shown in FIG. 4, each of the rocker cams 111 and 112 has a cam surface 111a and a basic circular surface 111b, either of which contacts to an upper surface of a tappet 115, as a conventional valve drive cam does, except that the rocker cams do not continuously rotate, but rocks. The tappet 115 is supported by a valve spring 116, which is sustained between retainers 117 and 118, as is known in the art.

Referring back to FIG. 3, arranged above and in parallel with the assembly of inner shaft 105 and the rocker cam parts 110 through 112 is a control shaft 120, which is rotationally supported by bearings not shown. The control shaft 120 integrally forms a worm gear 121 coaxially at its outer peripherally. The worm gear 121 engages with a worm 122, which is affixed to an output shaft of an electric motor 123 that is controlled by an VVL control system 202 shown in FIG. 1. Therefore, the motor 123 may rotate the control shaft 120 to its desired position, in accordance with a control signal $\theta_{VVL}$ from the engine controller 15.

Four control arms 131 for the respective cylinders 22 are attached to the control shaft 120, so that the control arms 131 can pivot integrally with the control shaft 120. A control link 132 couples each of the control arms 131 and the respective ring arm 107 through a control pivot 133 and a common pivot 134. Then, a rocker link 135 couples the ring arm 107 and the first cam 111 through the common pivot 134 and a rocking pivot 136.

FIG. 4 and FIG. 6(A) show a condition where a valve lift is greater. The control arm 131 is adjusted to define a VVL control angle $\theta_{VVL\_A}$ between the horizontal plane shown by a dotted line in FIG. 6(A) and a line connecting the center axes of the control shaft 120 and the control pivot 133.

When the inner shaft 105 rotates around the axis X clockwise on the sheet of Figures from a no-lift state (1) to a maximum-lift state (2) in FIG. 4 or from a state shown by broken lines to a state shown by solid lines in FIG. 6(A), the common center Y of the eccentric cam 106 and the ring arm 107 orbits clockwise from points $Y_{1A}$ to $Y_{2A}$ around the axis X as shown in FIG. 6(A). The orbital movement of the ring arm 107 causes a rocking movement of the control link 132 by an angle $\theta_{132A}$ around the control pivot 132 due to a first four-link relationship consisting of four pivots X, Y, 133 and 134 and the corresponding links. Therefore, the common pivot 134 rocks around the control pivot 133. The common pivot 134 is at its rotational end positions when the axis X, the common center Y and the common pivot 134 are in line. One of the end positions of the common pivot 134 is shown by the solid lines in FIG. 6(A).

Four pivots 133, 134, 136 and X and corresponding links consist a second four-link relationship. It converts the rocking movement of the common pivot 134 by the angle $\theta_{132A}$ to a rocking movement of the rocker cam 111 or 112 by an angle $\theta_{111A}$ around the axis X. When the common center Y is located at $Y_{A1}$, the cam 111 is at one of its angular end positions because the common pivot is at its rotational end as described above and as shown in FIG. 6(A).

When the cam surface 111a of the rocker cam 111 or 112 contacts the tappet top surface 115a as in the state (1) of FIG. 4 and as shown by the solid line in FIG. 6(A), the rocker cam 111 or 112 moves down the tappet 115 against the valve spring 116. Then, the tappet 115 causes the intake valve 41 to move down to its maximum valve lift under the angle $\theta_{VVL\_A}$ of the control arm 131 in FIG. 6(A).

On the other hand, when the basic circular surface 111b contacts the tappet top surface 115a as shown in the state (1) of FIG. 4 and by the broken line in FIG. 6(A), the tappet 115 is not pushed down, because the basic circular surface 111b has a constant radius smaller than a distance between a point of the cam surface 111a and the axis X. Therefore, the angle $\theta_{VVL\_A}$ or the angular position of the control arm 131 causes a valve lift $h_A$ as shown in FIG. 6(A).

Figure 5:
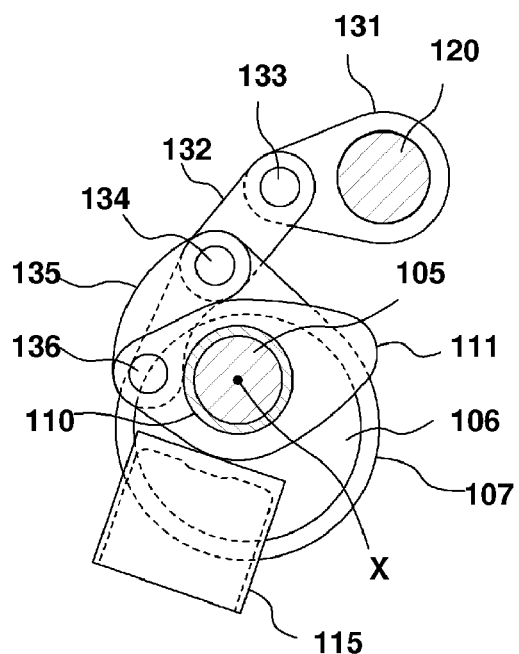
FIG. 5 shows a side view of the variable valve lift mechanism for a valve open state (1) and a valve closed state (B) with a smaller valve lift in accordance with the embodiment.
Figure 5:
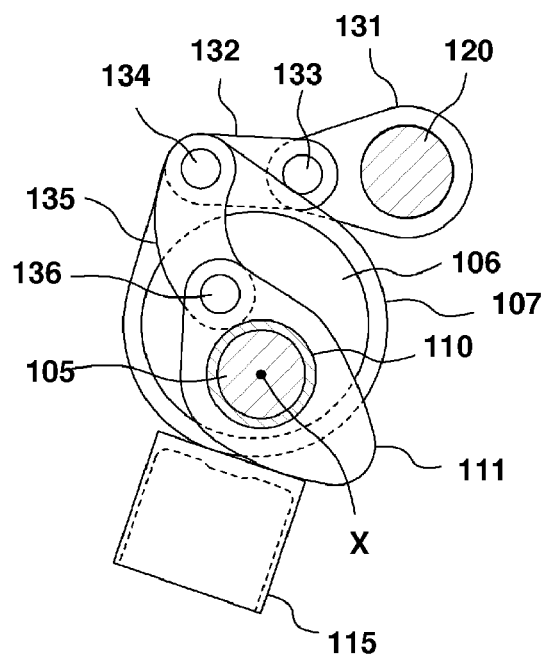

FIGS. 5 and 6(B) show a condition of smaller valve lift $L_B$. The control arm 131 is adjusted to define an angle $\theta_{131B}$ between the horizontal plane shown by the dotted line and the line connecting the center axes of the control shaft 120 and the control pivot 133 as shown in FIG. 6(B). In this Figure, as the inner shaft 105 rotates clockwise, the common center Y orbits from points $Y_{1B}$ to $Y_{2B}$. For the illustrative purpose, the point $Y_{1B}$ is the same point as $Y_{1A}$ in FIG. 6(A). The position $Y_{2B}$ is one of angular end positions where the axis X, the common center Y and the common pivot 133 are in line.

The first four-link relationship consisting of the pivots X, Y, 133 and 134 and the others causes an angular movement of the control link 132 by an angle $\theta_{132B}$. Then, the second four-link relationship consisting of the pivots 133, 134, 136 and X converts the angular movement of the control link 132 or the common pivot 134 into a rocking movement of the rocking cam 111 or 112 with an angle $\theta_{111B}$. When the common center Y is located at $Y_{B1}$, the cam 111 is at one of its angular end positions because the common pivot Y is at its rotational end as described above and as shown in FIG. 6(B).

Figure 6:
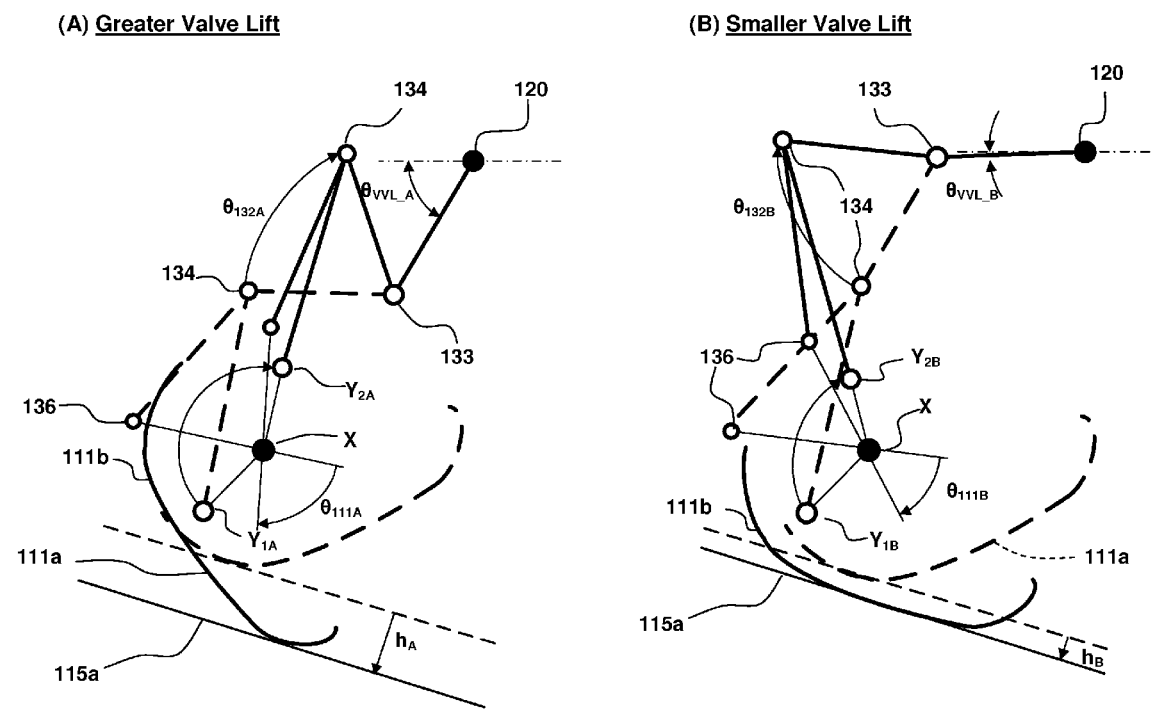
FIG. 6 is explanatory diagrams for the greater valve lift (A) and the smaller valve lift (B) respectively illustrated in FIGS. 4 and 5.

When the basic circular surface 111b contacts tappet top surface 115a as shown in the state (1) of FIG. 5 and by the broken line in FIG. 6(B), the tappet 115 is not pushed down as in the case of FIG. 6(A). When the cam 111 is positioned as shown by the solid line in FIG. 6(B), the cam surface 111a contacts the tappet top surface 115a and pushes down the tappet 115 most under the angular position $\theta_{131B}$ of the control arm 131. As can be seen from FIG. 6, a valve lift $h_B$ is much smaller than the valve lift $h_A$. Therefore, as the angle $\theta_{VVL}$ is smaller, the peak valve lift h decreases. If the angle $\theta_{VVL}$ is further increased, the valve lift can be zero depending on the configuration of a variable valve lift (VVL) mechanism.

Further, as the angle $\theta_{VVL}$ is smaller, the rocking angle $\theta_{111}$ decreases, and the angular position $Y_2$ of the common center Y, with which the maximum valve lift is obtained, shifts counterclockwise. These can be seen from valve lift curves in FIG. 7. A valve lift curve $L_A$ illustrates the greater valve lift state with the angle $\theta_{VVL\_A}$ shown in FIGS. 4 and 6(A), and a valve lift curve $L_B$ illustrates the smaller valve lift state with the angle $\theta_{VVL\_B}$ shown in FIGS. 5 and 6(B), for a case where only the VVL actuator 123 is operated with the VCT mechanism 103 setting the inner shaft 105 at a fixed angular phase with respect to the crankshaft 6.

Figure 7:
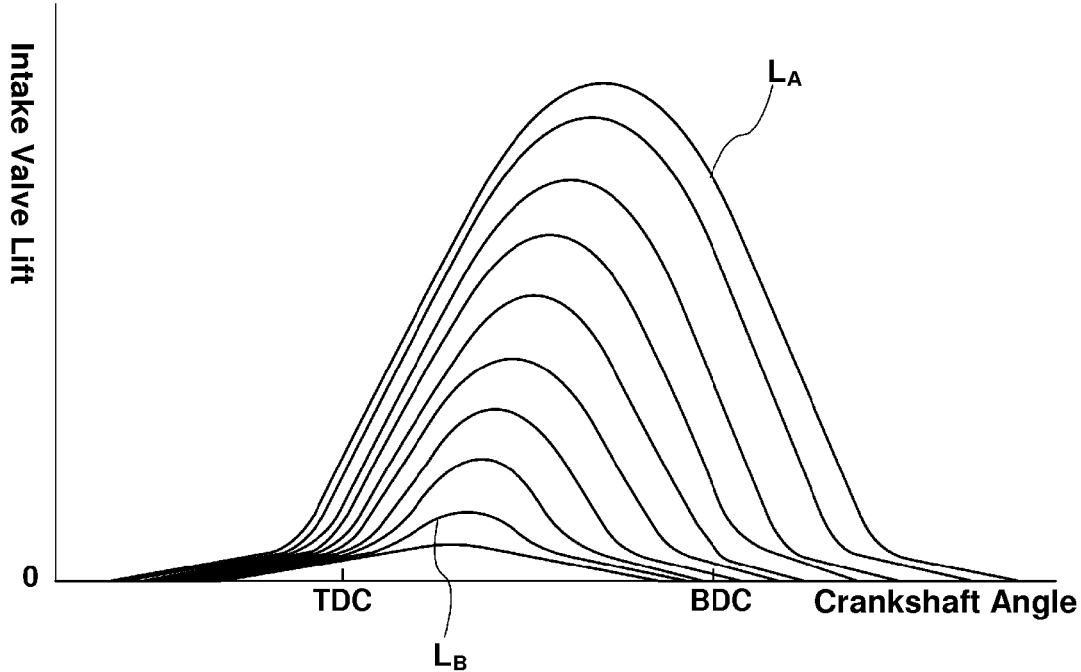
FIG. 7 shows various valve lift profiles generated by the valve lift mechanism in accordance with the embodiment.

As can be seen from FIG. 7, the variable valve lift (VVL) mechanism has characteristics where valve opening duration increases, peak valve lift timing is retarded and valve closing timing is retarded as the maximum valve lift increases. Further it can be seen that the valve opening timing does not change so much as the valve closing timing does.

This valve lift characteristic is preferable for regulating air charge inducted into the combustion chamber 8. When the throttle valve 21 is closed to regulate the air charge, it causes restriction of intake air flow to the combustion chamber 8, and the kinetic energy of the engine moving parts, such as the piston 5 and the crankshaft 6, are spent for pumping in the restricted air in an intake stroke of an engine cylinder cycle. This is called "pumping loss".

Rather, the valve lift characteristic shown in FIG. 7 can regulate air charge with less throttling and less pumping loss.

Basically, the air charge will be decreased as the intake valve closing timing is advanced or retarded from certain timing. The certain timing is at the bottom dead center of the piston if the engine speed is extremely low because there is no inertia of the intake airflow. Practically, it retards as the inertia of the intake airflow increases. The inertia more heavily weights on the intake airflow rate or engine speed. Further, greater valve lift is required for greater airflow.

Otherwise, flow restriction may occur at the intake port throat 9a and the intake valve 11 when the air flow increases in dependence on the increased airflow rate or air charge. The VVL mechanism described above has the characteristic where the valve closing timing is retarded as the valve lift is greater as shown in FIG. 7 and described above. Therefore, it can preferably meet to the requirement for regulating air charge into the combustion chamber 8 with less throttling.

The engine controller 100 is a microcomputer based controller having a central processing unit which runs programs using data, memories, such as RAM and ROM, storing the programs and data, and input/output (I/O) bus inputting and outputting electric signals, as is well known in the art. The engine controller 100 receives signals from various sensors. As shown in FIG. 1, the input signals to the engine controller 100 include a signal AF from an air flow meter 51 arranged in the air cleaner described above and known in the art, a pulse signal from a crank angle sensor 52 based on which an engine speed $N_E$ is computed by the engine controller 100, a signal a from an accelerator position sensor 53 detecting a position of an accelerator pedal 54, a signal MAP from a pressure sensor 55 detecting a pressure in the intake manifold 30, and an a signal EGO from an oxygen sensor 56 detecting an oxygen concentration in the exhaust gas upstream of the catalytic converter 24.

Based on these input signals, the engine controller 100 computes and outputs various control signals including the signal SA to the ignition system 16, the signal FP to the fuel system 18, the signal TVO to the throttle actuator 22, the signal SV to the shutter actuator 36, a signal $\theta_{VCT}$ to the VCT control system 201, and a signal $\theta_{VVL}$ to the VVL control system 202.

Control routines R1 through R3 executed by the controller 100 will now be described with reference to flow charts of FIGS. 8 through 10. The illustrated routines R1 through R3 are mainly for the shutter actuator 36, the VCT control system 201 and the VVL control system 202. The engine controller 100 executes the rest of control on the engine 1 in manners known in the art.

For example, the fuel signal FP may be computed based on the intake airflow AF detected by the airflow meter 31 and the engine speed $N_E$ so as to achieve a target air-fuel ratio in the combustion chamber and further corrected based on the oxygen concentration in the exhaust gas detected by the exhaust gas oxygen sensor 56. The intake airflow AF is controlled by using the throttle valve 20 or the intake valve drive mechanism 101 based on desired engine output torque $TQ_D$ and the engine speed $N_E$. Therefore, if the air-fuel ratio is constant, most likely to be a stoichiometric air fuel ratio for a fuel supplied to the engine 1, the intake airflow AF is a function of a product of the desired engine output torque $TQ_D$ and the engine speed $N_E$.

Figure 8:
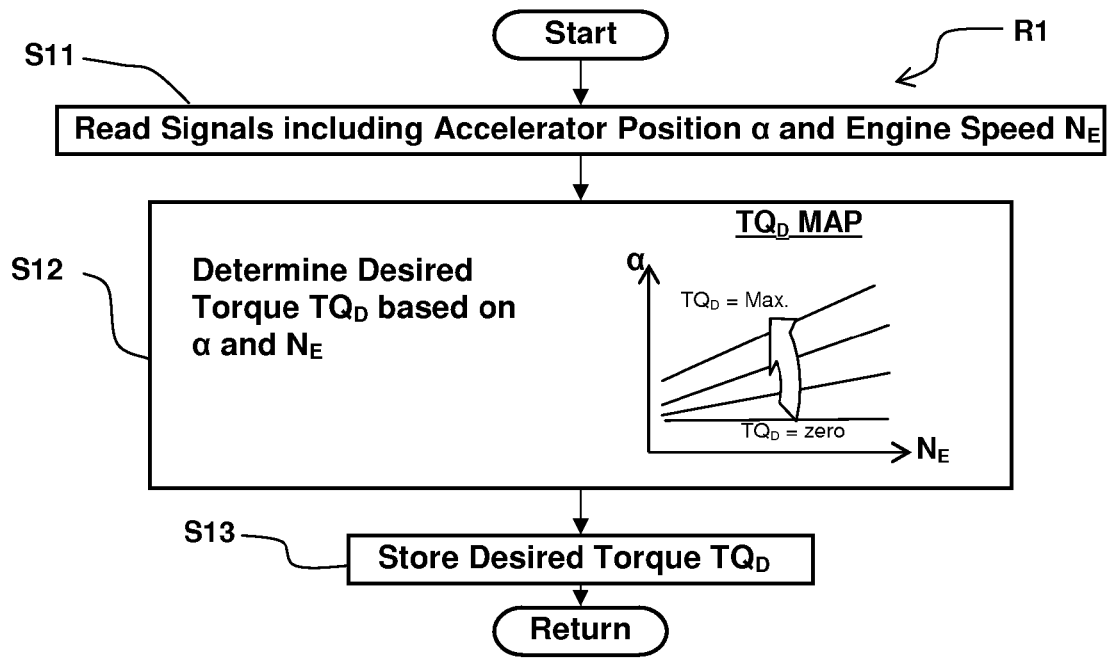
FIG. 8 is a flowchart showing one of the control routines executed by an engine controller in accordance with the embodiment.

As shown in FIG. 8, the routine R1 determines desired engine output torque $TQ_D$ based on the position α of the accelerator pedal 34 and the engine speed $N_E$. After the start, the routine R1 proceeds to a step S11 and reads signals, which the engine controller 100 has read from the sensors described above and stored in its memory. The read signals include the position a of the accelerator pedal 34 detected by the accelerator position sensor 33 and the engine speed $N_E$ that the engine controller 100 computes from the crank angle signal detected by the crank angle sensor 52.

Then, the routine R1 proceeds to a step S12 and determines a desired engine output torque $TQ_D$ based at least on the accelerator position α and the engine speed $N_E$ by referring to a $TQ_D$ map. The desired torque $TQ_D$ is mapped to increase in proportion to increase of the accelerator position α and the engine speed $N_E$. Additionally, other engine parameters such as a transmission gear ratio, a cruise control signal, engine temperature, ambient temperature, or ambient pressure may be considered for the desired torque determination. After the step S12, the routine R1 proceeds to a step S13, and the engine controller 100 stores the desired engine output torque $TQ_D$ determined at the step S12 into its memory. Then, it returns.

Figure 9:
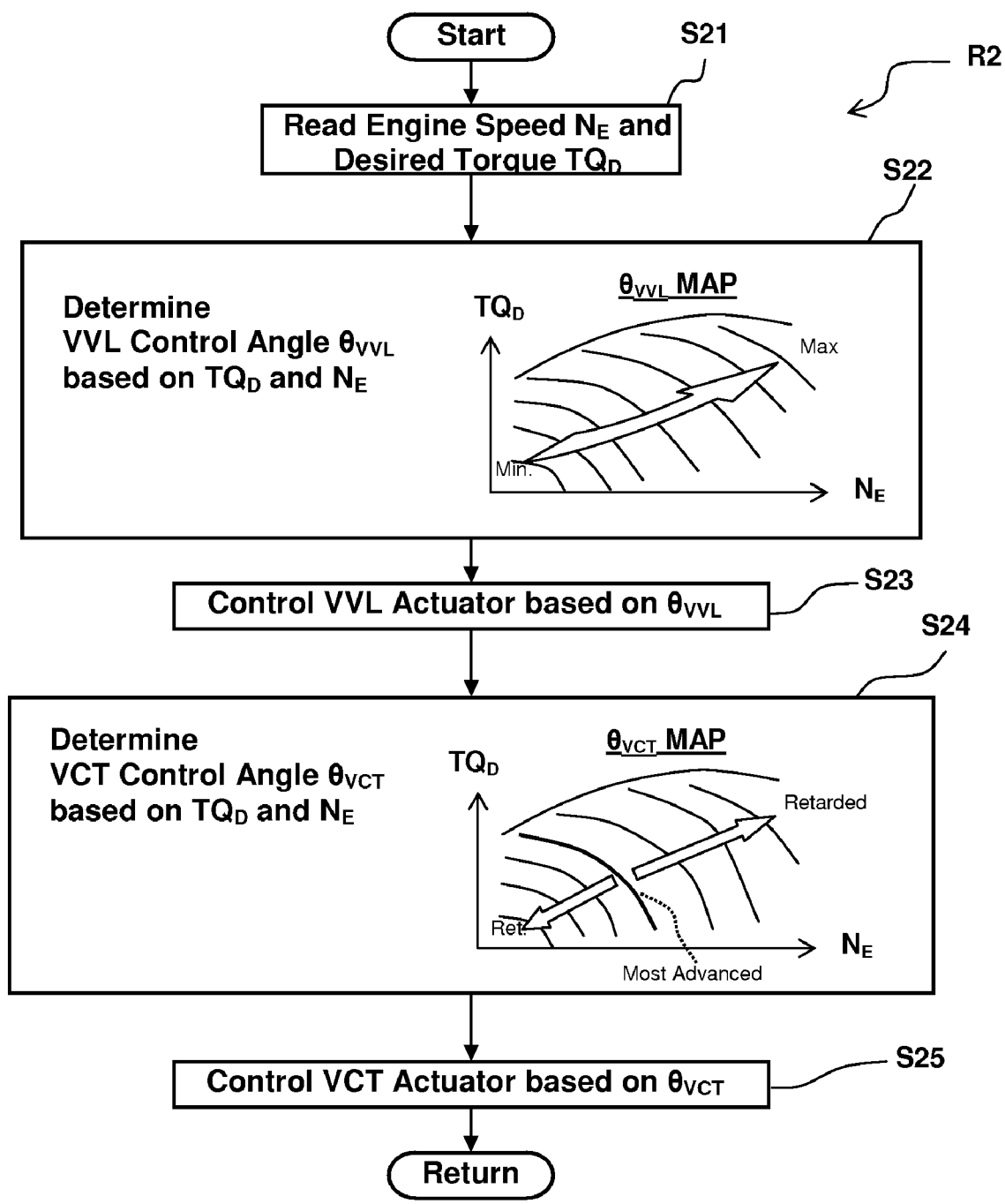
FIG. 9 is a flowchart showing one of the control routines executed by the engine controller in accordance with the embodiment.

As shown in FIG. 9, the routine R2 controls the intake valve drive mechanism 101. After the start, the routine R2 proceeds to a step S21 and reads the engine speed $N_E$ and the desired engine output torque $TQ_D$ that is determined at the step S12 and stored in the engine controller memory at the step S13. Then, the routine R2 proceeds to a step S22 and determines a VVL control angle $\theta_{VVL}$ based on the engine speed $N_E$ and the desired engine output torque $TQ_D$ by referring to a $\theta_{VVL}$ map. The VVL control angle $\theta_{VVL}$ indicates an angular position of the control shaft 120 of the VVL mechanism shown in FIGS. 3 through 6. It corresponds to a peak valve lift as described above. Although it will be described in more detail later with reference to FIG. 11, the VVL control angle $\theta_{VVL}$ is mapped so that peak valve lifts are greater as the engine speed $N_E$ increases or the desired torque $TQ_D$ increases. After the VVL control angle $\theta_{VVL}$ is determined, the routine R2 proceeds to a step S23, and the engine controller 100 outputs the signal $\theta_{VVL}$ to the VVL control system 202 to control the VVL actuator 123 to adjust the control arm 120 at the position corresponding to the signal $\theta_{VVL}$.

Then, the routine R2 proceeds to a step S24 and determines a VCT control angle $\theta_{VCT}$ based on the engine speed $N_E$ and the desired engine output torque $TQ_D$ by referring to a $\theta_{VCT}$ map. The VCT control angle $\theta_{VCT}$ indicates a relative phase between the crankshaft 6 and the inner shaft 105 of the intake valve drive mechanism 101 shown in FIG. 3. Although it will be described in more detail later with reference to FIG. 12, the VCT control angle $\theta_{VCT}$ is mapped in first and second areas. In the first area where the engine speed $N_E$ and the desired torque $TQ_D$ are relatively small, the VCT control angle $\theta_{VCT}$ increases so that the angular phase of the inner shaft 105 gets more advanced as the engine speed $N_E$ increases or the desired torque $TQ_D$ increases. In the second area where the engine speed $N_E$ and the desired torque $TQ_D$ are relatively great, the VCT control angle $\theta_{VCT}$ decreases so that the angular phase of the inner shaft 105 gets more retarded as the engine speed $N_E$ increases or the desired torque $TQ_D$ increases. After the VCT control angle $\theta_{VCT}$ is determined, the routine R2 proceeds to a step S25, and the engine controller 100 outputs the signal $\theta_{VCT}$ to the VCT control system 201 to control the VCT actuator 103 to adjust the inner shaft 105 to the angular phase corresponding to $\theta_{VCT}$. Then, the routine R2 returns.

Figure 10:
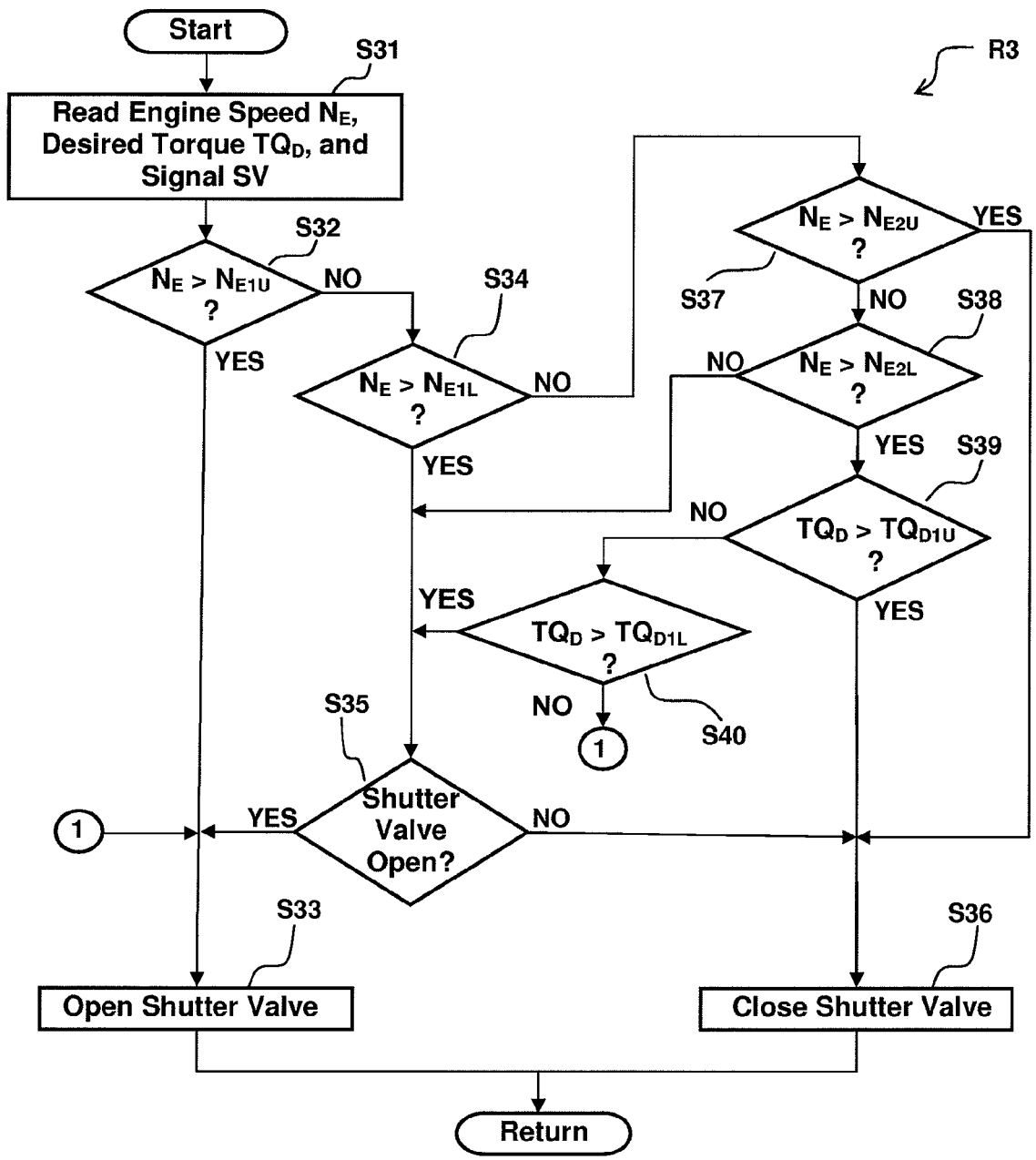
FIG. 10 is a flowchart showing one of the control routines executed by the engine controller in accordance with the embodiment.

As shown in FIG. 10, the routine R3 controls the shutter valve 35 based on the desired torque $TQ_D$ and the engine speed $N_E$. After a start, the routine R3 proceeds to a step S31 and reads the engine speed $N_E$, the desired engine output torque $TQ_D$ that is determined at the step S12 and stored in the engine controller memory at the step S13, and the signal SV for the shutter actuator 36 that is determined and stored in the engine controller memory during the execution of this routine R3. Then, it proceeds to a step S32 and determines whether or not the read engine speed $N_E$ is greater than a first upper predetermined speed $N_{E1U}$ which may be for example 2500 rpm. When it is determined that the engine speed $N_E$ is greater than the first upper predetermined speed $N_{E1}$ (YES) at the step S32, the routine proceeds to a step S33, and the engine controller 100 outputs a signal $SV_{OPEN}$ to the shutter valve actuator 36 to open the shutter valve 35. Then, the routine R3 returns.

On the other hand, when it is determined that the engine speed $N_E$ is not greater than the first upper predetermined speed $N_{E1U}$ (NO) at the step S32, the routine proceeds to a step S34 and determines whether or not the read engine speed $N_E$ is greater than a first lower predetermined speed NELL which is set slightly lower than $N_{E1U}$ for avoiding excessively frequent actuations of the shutter actuator 36. When it is determined that the engine speed $N_E$ is greater than the first lower predetermined speed NELL (YES) at the step S34, the routine proceeds to a step S35 and determines whether or not the shutter valve 35 is currently open based on the signal SV read at the step S31. When it is determined that the shutter valve 35 is open (YES) at the step S35, the routine proceeds to the step S33, and the engine controller 100 outputs a signal $SV_{OPEN}$ to the shutter valve actuator 36 to keep the shutter valve 35 open. On the other hand, it is determined that the shutter valve 35 is closed (NO) at the step S35, the routine proceeds to a step S36, and the engine controller 100 outputs a signal $SV_{OPEN}$ to the shutter valve actuator 36 to keep the shutter valve 35 closed. Therefore, when the engine speed $N_E$ is between the first upper and lower predetermined speeds $N_{E1U}$ and $N_{E1L}$, the shutter valve 35 will keep its current open or closed state. After either of the steps S33 and S36, the routine returns.

When it is determined that the engine speed $N_E$ is not greater than the first lower predetermined speed $N_{E1L}$ (NO) at the step S34, the routine proceeds to a step 37 and determines whether or not the read engine speed $N_E$ is greater than a second upper predetermined speed $N_{E2U}$ which may be for example 1000 rpm. When it is determined the engine speed $N_E$ is greater than the second upper predetermined speed $N_{E2U}$ (YES) at the step S37, the routine R3 proceeds to the step S36, and the engine controller 100 outputs the signal $SV_{CLOSE}$ to the shutter actuator 36 to close the shutter valve 35. Then, the routine R3 returns.

When it is determined the engine speed $N_E$ is not greater than the second upper predetermined speed $N_{E2U}$ (NO) at the step S37, the routine R3 proceeds to a step S38 and determines whether or not the read engine speed $N_E$ is greater than a second lower predetermined speed $N_{E2L}$ which is set slightly lower than $N_{E2U}$. When it is determined that the engine speed $N_E$ is greater than the second lower predetermined speed $N_{E2L}$ (YES) at the step S38, the routine R3 proceeds to the step S35 and then the step S33 or S36, and the engine controller 100 sends the signal $SV_{OPEN}$ or $SV_{CLOSE}$ to keep the shutter valve 35 at its current open or closed state as described above. Then, the routine R3 returns.

When it is determined that the engine speed $N_E$ is not greater than the second lower predetermined speed $N_{E2L}$ (NO) at the step S38, the routine R3 proceeds to a step S39 and determines whether or not the read desired engine torque $TQ_D$ is greater than a first upper predetermined engine torque $TQ_{1U}$. When it is determined that the desired engine torque $TQ_D$ is greater than the first upper predetermined engine torque $TQ_1$ (YES) at the step S39, the routine proceeds to the step S36, and the engine controller 100 outputs the control signal $SV_{CLOSE}$ to the shutter actuator 36 to close the shutter valve 35. Otherwise, the routine proceeds to the step S40, and determines whether or not the read desired engine torque $TQ_D$ is greater than a first lower predetermined engine torque $TQ_{1L}$.

When it is determined that the desired engine torque $TQ_D$ is not greater than the first lower predetermined engine torque $TQ_{1L}$ (NO) at the step S40, the routine R3 proceeds to the step S33, and the engine controller 100 outputs the control signal $SV_{OPEN}$ to the shutter actuator 36 to open the shutter valve 35.

On the other hand, when it is determined that the desired engine torque $TQ_D$ is greater than the first lower predetermined engine torque $TQ_{1L}$ (YES) at the step S40, the routine R3 proceeds to the step S35 and then the step S33 or S36, and the engine controller 100 sends the signal $SV_{OPEN}$ or $SV_{CLOSE}$ to keep the shutter valve 35 at its current open or closed state as described above. Then, the routine R3 returns.

Figure 11:
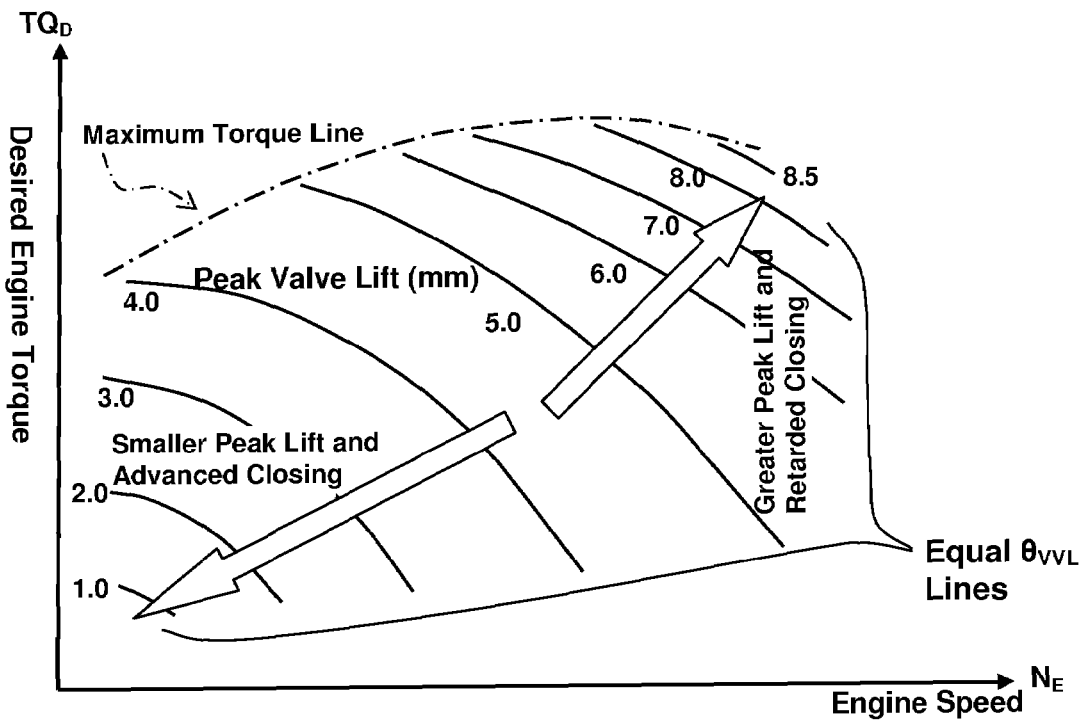
FIG. 11 shows a profile of a control angle of the variable valve lift mechanism over a range of engine operating condition in accordance with the embodiment.

FIG. 11 illustrates in more detail the $\theta_{VVL}$ map which is referenced at the step S22 of the routine R2 shown in FIG. 9 by indicating peak valve lift that corresponds to the VVL control angle $\theta_{VVL}$. It consistently increases as the engine speed $N_E$ increases or the desired engine torque $TQ_D$ increases. As described above, since the intake airflow is the function of the product of the desired engine torque $TQ_D$ and the engine speed $N_E$, the VVL control angle $\theta_{VVL}$ consistently increases as the desired intake airflow to the combustion chamber 8 increases.

Because of the valve lift characteristics of the VVL mechanism shown in FIG. 7 and described above, if the VCT control angle $\theta_{VCT}$, which is usually adjusted at the step S24, is fixed, the peak valve lift increases and the intake valve closing timing is retarded, as shown in FIG. 11.

Figure 12:
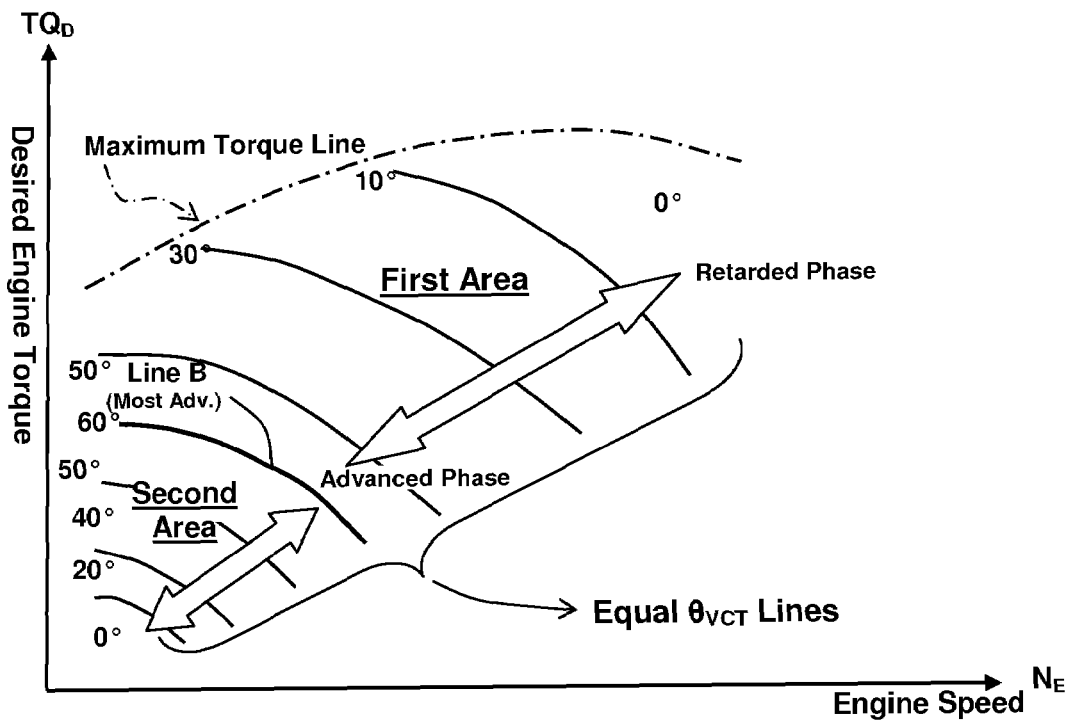
FIG. 12 shows a profile of a control angle of the variable cam timing mechanism over the range of engine operating condition in accordance with the embodiment.

FIG. 12 illustrates in more detail the $\theta_{VCT}$ map which is referenced at the step S24 of the routine R2 shown in FIG. 9 by indicating a relative phase angle of the inner shaft 105 with respect to the phase of the driven sprocket 104 shown in FIG. 4. In the first engine operating area of higher torque $TQ_D$ and higher engine speed $N_E$, which is the upper right side of a line B in FIG. 12, the VCT control angle $\theta_{VCT}$ is consistently retarded as the engine speed $N_E$ increases, the desired engine torque $TQ_D$ increases, or the desired intake airflow to the combustion chamber 8 increases. On the other hand, in the second engine operating area of lower torque $TQ_D$ and lower engine speed $N_E$, which is the lower left side of the line B in FIG. 12, the VCT control angle $\theta_{VCT}$ is consistently retarded as the engine speed $N_E$ decreases, the desired engine torque $TQ_D$ decreases, or the desired intake airflow to the combustion chamber 8 increases.

The control routines described above, specifically the routine R2, uses both of the $\theta_{VVL}$ map and the $\theta_{VCT}$ map. In the first engine operating area of FIG. 12, as the engine speed $N_E$, the desired engine torque $TQ_D$, or the desired intake airflow to the combustion chamber 8 increases, the both VVL control angle $\theta_{VVL}$ and VCT control angle $\theta_{VCT}$ increase. This more greatly retards the intake valve closing timing, since the each angle increase retards the intake valve closing timing. Therefore, the air charge to the combustion chamber 8 can be more effectively regulated with less throttling.

On the other hand, in the second engine operating area of FIG. 12, as the engine speed $N_E$, the desired engine torque $TQ_D$, or the desired intake airflow to the combustion chamber 8 increases, the VVL control angle $\theta_{VVL}$ increases but the VCT control angle $\theta_{VCT}$ decreases. Then, the closing timing advance caused by VCT control angle decrease compensates the closing timing retard caused by the VVL control angle increase. Therefore, the intake valve closing timing does not change so much as in the first engine operating area.

Instead, the intake valve opening timing advances as the engine speed $N_E$ decreases, the desired engine torque $TQ_D$, the desired intake airflow decreases, because the change of the VVL control angle $\theta_{VVL}$ less affects the intake valve opening timing as shown in FIG. 7.

Figure 13:
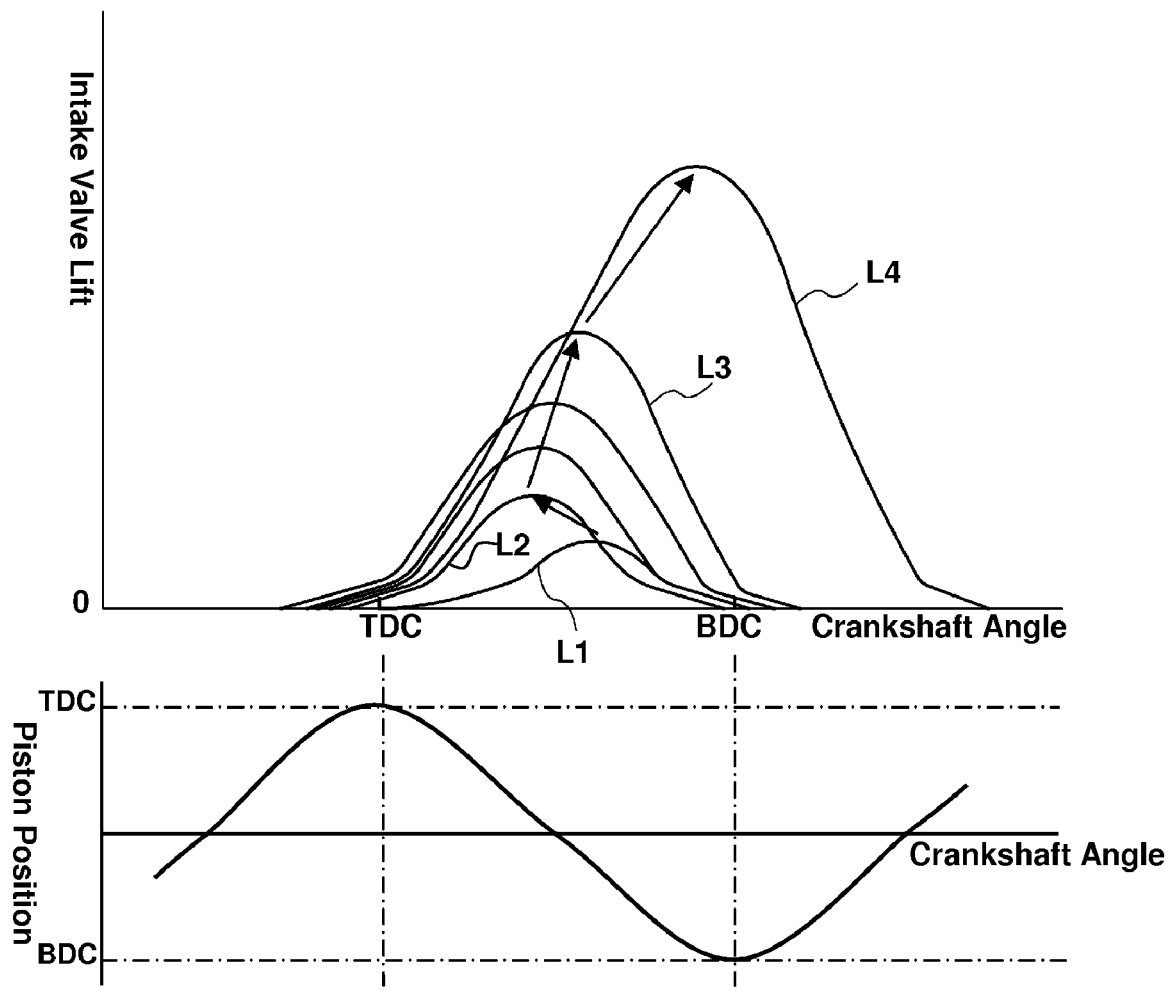
FIG. 13 shows various valve lift profiles generated by a combination of the variable cam timing mechanism and the variable valve lift mechanism in accordance with the embodiment.

FIG. 13 shows various lift curves L1 through L4 of the intake valve 11 that are generated by the control routine R2. The lift curve L1 is created at a lower engine torque and speed condition in the second engine operating area in FIG. 12. The lift curve L2 is generated on the boundary between the first and second engine operating conditions. The lift curve L3 is generated at a higher engine torque and lower engine speed condition in the first engine operating condition and corresponds to the peak valve lift equal to 5 mm shown in FIG. 11.

Finally, the lift curve L4 is created at a higher engine torque and speed condition in the first engine operating condition.

Between the lift curves L2 and L4, or in other words, within the first engine operating area shown in FIG. 12, the valve closing timing is retarded as the peak valve lift increases. Between the lift curves L2 and L3, the intake valve 11 is substantially closed before BDC. As described above, intake valve closing timing for the greatest air charge varies in dependence on the engine speed. The closing timing of the lift curve L3 corresponds to the greatest air charge in the mid engine speed range. The closing timing of the lift curve L2 corresponds to the smaller air charge in the mid engine speed range. Therefore, the air charge can be regulated in the mid engine speed range by setting the valve lift curve between the curves L2 and L3.

Between the lift curves L3 and L4, the intake valve 11 is substantially closed before BDC. In the higher engine speed range, the closing timing of the lift curve L3 corresponds to the smaller air charge due to the inertia of the intake airflow described above, and that of L4 corresponds to the greatest air charge. Therefore, the air charge can be regulated in the higher engine speed range by setting the valve lift curve between the curves L2 and L3.

On the other hand, between the lift curves L1 and L2, in other words, within the second engine operating condition shown in FIG. 12, the intake valve opening timing is retarded while the closing timing does not substantially change as the peak valve lift decreases. On the lift curve L1, the intake valve 11 starts opening after the top dead center (TDC) when the piston 8 starts descending as shown in FIG. 13. Then, the lift curve L1 reaches at the peak lift in the latter half of the piston descending stroke. Even with the smaller peak valve lift, the greater piston descending movement in the latter half of the piston descending stroke causes greater airflow. Even with some variation of the intake airflow between the cylinders, such as geometric variation of the intake passages, the greater airflow makes the amount of flow to be more consistent between the cylinders. Therefore, especially in a lower speed and torque condition where the desired air charge is relatively small and its deviation may affect more the engine operating condition such as an air-fuel ratio in the combustion chamber, the retarded intake valve opening timing of the valve lift L1 makes the engine operation more stable.

Figure 14:
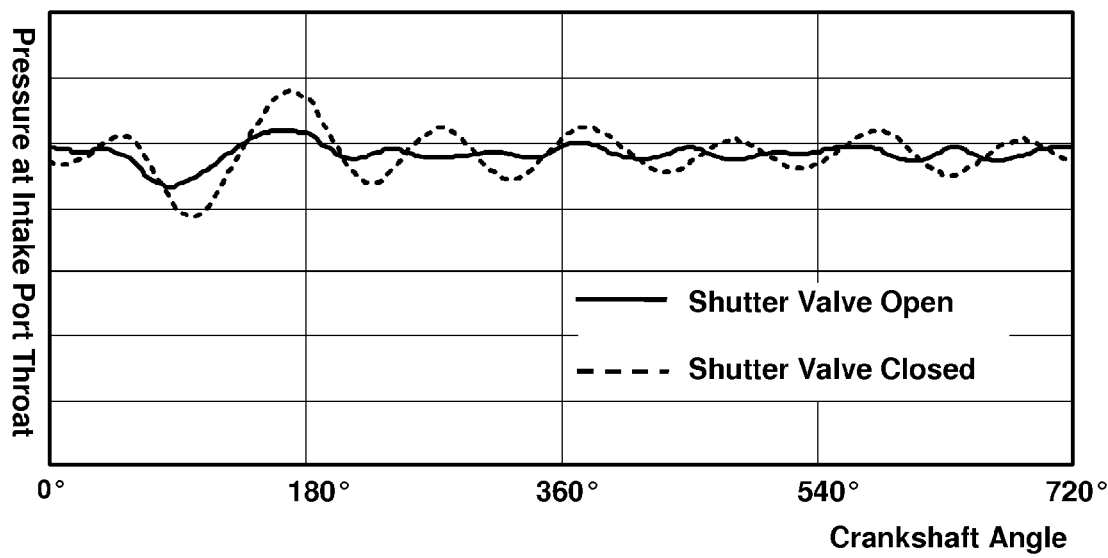
FIG. 14 shows graphs of pressures in an intake ports in accordance with the embodiment (shown by a solid line in (A)) and comparative examples (shown by a dotted line in (A) and solid and dotted lines in (B))
Figure 14:
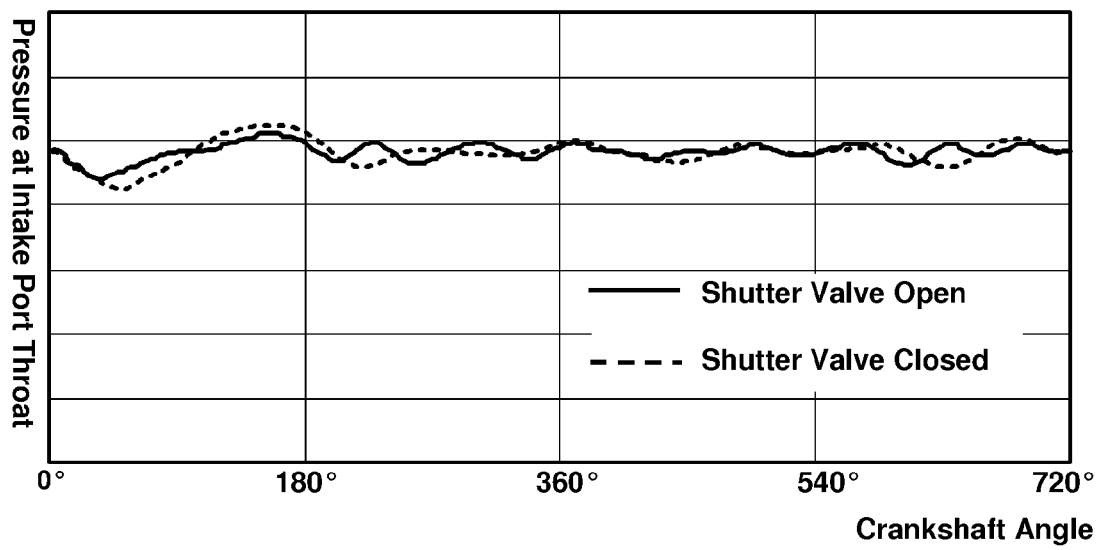

With the retarded intake valve opening timing of the lift curve L1, the piston 5 has already descent for some distance and generates negative pressure within the combustion chamber 8 when the intake valve 11 is substantially opened. FIG. 14 shows a comparison between pressure changes with the intake valve opening timings after TDC (for the lift curve L1) (A) and before TDC (B) at the intake port throat 9a under a same engine operating condition where the engine speed and air charge are relatively low such as in an engine idle condition. As can be seen from FIG. 14, the retarded intake valve opening timing of the lift curve L1 generates greater amplitude of the pressure wave.

Referring back to FIG. 13, as the lift curve moves from L1 to L2, the intake valve opening timing is advanced while the closing timing does not substantially change and regulate the air charge into the combustion chamber 8. Instead, the change of the peak valve lift may regulate the air charge. Additionally, the throttle valve 21 may be used for the air charge regulation.

Figure 15:
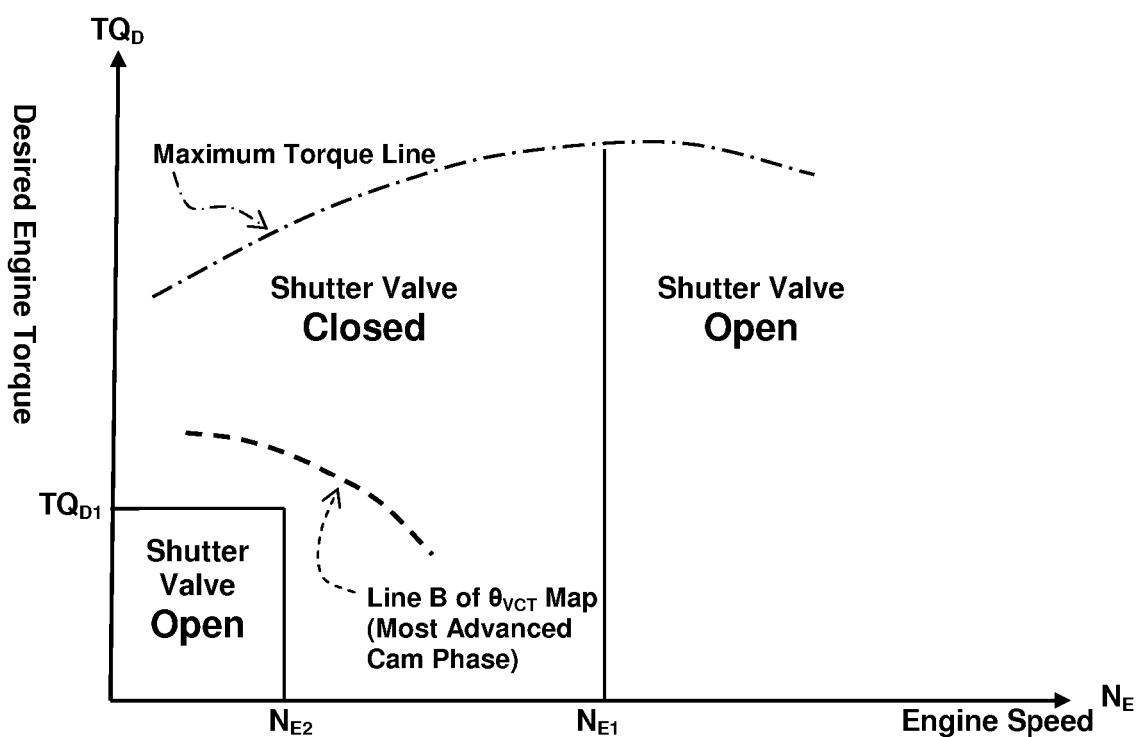
FIG. 15 shows open and closed states of the shutter valve with a line of most advance cam timing over the range of engine operating condition in accordance with the embodiment.

The control routine R3 shown in FIG. 10 opens and closes the shutter valve 35 depending on the engine speed $N_E$ and the desired torque $TQ_D$ as shown in FIG. 15. Note that in FIG. 15 and the following description, the first upper and lower predetermined speed $N_{E1U}$ and $N_{E1L}$, the second upper and lower predetermined speed $N_{E2U}$ and $N_{E2L}$ and the first upper and second predetermined desired torque $TQ_{D1U}$ and $TQ_{D2L}$ are collectively called the first predetermined speed $N_{E1}$, the second predetermined speed $N_{E2}$, and the first predetermined desired torque $TQ_{D1}$, respectively. At a higher engine speed, specifically when it is determined the engine speed $N_E$ is greater than the first predetermined speed $N_{E1}$ at the step S32, the shutter valve 35 is opened, and the distance between the intake valve 11 and a larger volume, in this case the communication chamber 34, is shorter. As described above, the opening of the intake valve 11 generates the pressure wave which transmits in the intake air passage. When the shutter valve 11 is open, the effective length of the pressure wave transmission path is shorter than in the case of the closed shutter valve. In the higher engine speed range, the shorter path may cause the pressure wave to return the intake port throat 9a during the intake valve opening period and increase the air charge into the combustion chamber 8.

On the other hand, when the shutter valve 55 is closed, the effective length of the pressure wave transmission path between the intake valve 11 and a larger volume, in this case the surge tank 31, is longer. In the lower engine speed range, time duration for the pressure wave to take to return to the intake port throat 9a is longer than in the higher engine speed range. Therefore, the air charge into the combustion chamber 8 can be increased in the both higher and lower engine speed ranges by opening and closing the shutter valve 35 respectively above and below the engine speed $N_{E1}$.

When the engine 1 operates in an engine idle condition, or when the engine speed is not greater than the second predetermined speed $N_{E2}$ as determined at the step S38 and the desired engine torque $TQ_D$ is not greater than the first predetermined torque $TQ_{D1}$ as determined at the step S40 of the routine R3 shown in FIG. 9, the desired intake airflow is relatively small because the desired intake airflow is the function of the product of the engine speed $N_E$ and the desired torque $TQ_D$ as described above. In this operating area, the amplitude of the pressure wave generated by closing the shutter valve 35 may be great relatively to the amount of airflow as shown by dotted lines in FIG. 14. That relatively large pressure wave may affect each of the cylinders differently from each other, for example, because of the geometric variation of the intake passages. It may cause relatively great deviation between the cylinder air charges or cylinder air fuel ratios. These deviations may reduce stability of combustion of air-fuel mixture and cause fluctuation of engine speed and engine noise.

Further, in this embodiment, as described above, the intake valve starts opening relatively late in this lower torque and speed condition, and generates the greater amplitude of the pressure wave as shown in FIG. 14(A).

In this embodiment, when the engine 1 operates in the engine idle condition with the desired engine torque below $TQ_{D1}$ and the engine speed below $N_{E2}$ as determined at the steps S38 and S40 of the routine R3 shown in FIG. 10, the shutter valve 35 is opened at the step S33. The effective length of the pressure wave path is now the length between the intake valve 11 and the communication chamber 34, and the shorter effective length causes more reflections and attenuations of the pressure wave before it reaches the intake port throat 9a when the intake valve opens. Therefore, the amplitude of the pressure wave may be reduced as shown by a solid line in FIG. 14(A). The inadvertent effect of the pressure wave, such as the cylinder air charge deviation.

It is needless to say that the invention is not limited to the illustrated embodiments and that various improvements and alternative designs are possible without departing from the substance of the invention as claimed in the attached claims. For example, the VVL mechanism of the intake valve drive mechanism 101 is not limited to the type illustrated mainly in FIGS. 3 through 7 that has the peak valve lift retarded as the valve closing timing is retarded. But, it may be a type that has the peak valve lift timing fixed, and the valve opening and closing timings retarded and advanced symmetrically to each other.

The VCT mechanism 103 is not limited to the hydraulic actuator shown in FIG. 3 and described above, but it may be an electric motor, an electromagnetic actuator, or any other pertinent in the art. Further, the intake valve drive mechanism 101 may have electromagnetic valve actuators for the individual intake valves 11.

The communication chamber 34 is not limited to the one connects all of the branch intake passages 32 as shown in FIG. 2, but, for example, a volume chamber is provided for each of the branch intake passages 32. Further, any other form of intake passage that can change the effective length of the pressure wave transmission can be used, for example one that changes a position of an opening of the branch intake passage 32 and 33 to the surge tank 31. It can be realized by providing an opening the wall 36 between the communication chamber 34 and the surge tank 31, or providing a telescopic structure at the end of the branch intake passage.

The characteristic of the opening of the shutter valve 35 at the lower desired air charge condition is not limited to that illustrated in FIG. 15 where the shutter valve 35 is opened when the engine speed is less than the second predetermined speed $N_{E2}$ and the desired torque is less than the predetermined torque $TQ_{D1}$, but only the engine speed less than $N_{E2}$ may be used as the condition to open the shutter valve 35.

The invention claimed is:

1. A method of controlling an intake air passage of an internal combustion engine, said intake air passage cyclically communicating to a combustion chamber of said internal combustion engine, thereby inducting fresh air into said combustion chamber, said cyclic communication of said intake air passage to said combustion chamber generating a pressure wave in said intake air passage, comprising:
reducing an effective length of a transmission path of said pressure wave in an upstream direction of said intake air passage and retarding beginning of said cyclic communication as a desired air flow to said combustion chamber decreases.

2. The method as described in claim 1, wherein said beginning of said cyclic communication is retarded after a top dead center of an intake stroke of a cylinder cycle of said combustion chamber.

3. The method as described in claim 1, wherein said beginning of said cyclic communication is retarded as desired torque of said internal combustion engine decreases.

4. The method as described in claim 3, wherein said beginning of said cyclic communication is retarded as a speed of said internal combustion engine decreases.

5. The method as described in claim 1, wherein said effective length is reduced as a speed of said internal combustion engine decreases.

6. The method as described in claim 5, wherein said beginning of said cyclic communication is retarded as the speed of said internal combustion engine decreases.

7. The method as described in claim 1, wherein said beginning of said cyclic communication is retarded as desired output torque of said internal combustion engine decreases.

8. The method as described in claim 7, wherein said effective length is reduced as the desired output torque of said internal combustion engine decreases.

9. The method as described in claim 1, wherein said beginning of said cyclic communication is retarded by retarding opening timing of an intake valve of said combustion chamber.

10. The method as described in claim 9, wherein a peak lift of said intake valve is reduced as said opening timing is retarded.

11. An engine system comprising:
an intake air passage;
an internal combustion engine having a combustion chamber and an intake valve, said combustion chamber being capable of inducting fresh air from said intake air passage, and said intake valve cyclically communicating said intake passage to said combustion chamber, thereby generating a pressure wave in said intake passage;
an air passage adjustor configured to controllably change an effective length of transmission of the pressure wave in said intake air passage;
a valve lift adjustor capable of controllably adjusting opening timing of said intake valve; and
a controller configured to control said air passage adjustor to reduce said effective length and said valve lift adjustor to retard a beginning of said cyclic communication as a desired air flow to said combustion chamber decreases.

12. The engine system as described in claim 11, wherein said intake air passage comprises a first air chamber capable of communicating to said combustion chamber with a first effective length of the pressure wave transmission on at least part of said intake air passage and capable of at least partly reflecting the pressure wave, and a second air chamber capable of communicating to said combustion chamber with a second effective length of the pressure wave transmission on at least part of said intake air passage and capable of at least partly reflecting the pressure wave, said second effective length being shorter than said first effective length,
said air passage adjustor comprises a shutter valve capable of opening and shutting the communication of said second air chamber to said combustion chamber, and
said controller is further configured to control said actuator to open said shutter valve as the desired air charge to said combustion chamber decreases.

13. The engine system as described in claim 12, wherein the fresh air flows through said first air chamber to said combustion chamber.

* * * * *